United States Patent
Andrén et al.

(10) Patent No.: US 11,285,911 B2
(45) Date of Patent: Mar. 29, 2022

(54) VEHICLE SEAT BELT ASSEMBLY

(71) Applicant: Volvo Car Corporation, Gothenburg (SE)

(72) Inventors: Pontus Andrén, Gothenburg (SE); Håkan Salomonsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 144 days.

(21) Appl. No.: 16/799,929

(22) Filed: Feb. 25, 2020

(65) Prior Publication Data
US 2021/0261088 A1    Aug. 26, 2021

(51) Int. Cl.
*B60R 22/12* (2006.01)
*B60R 22/18* (2006.01)
*B60R 22/22* (2006.01)

(52) U.S. Cl.
CPC ............. *B60R 22/18* (2013.01); *B60R 22/12* (2013.01); *B60R 22/22* (2013.01); *B60R 2022/1818* (2013.01)

(58) Field of Classification Search
CPC ......... B60R 22/18; B60R 22/12; B60R 22/22; B60R 2022/181
USPC ...................................... 280/801.1
See application file for complete search history.

(56) References Cited

U.S. PATENT DOCUMENTS

| | | | | |
|---|---|---|---|---|
| 2,715,984 | A * | 8/1955 | Brownstein | A41H 37/08 223/49 |
| 4,070,038 | A * | 1/1978 | Bergman | B60R 22/22 297/482 |
| 4,169,614 | A | 10/1979 | Ellens | |
| 6,256,867 | B1 * | 7/2001 | Bainbridge | B60R 22/24 242/615.3 |
| 7,516,711 | B2 * | 4/2009 | Messner | B60R 22/12 112/470.33 |
| 8,650,721 | B2 * | 2/2014 | Ogawa | B60R 22/12 24/182 |
| 2014/0265290 | A1 * | 9/2014 | Ver Hoven | B60R 22/1954 280/806 |
| 2021/0078524 | A1 * | 3/2021 | Thiel | B60R 22/12 |

FOREIGN PATENT DOCUMENTS

| | | |
|---|---|---|
| DE | 2720814 A1 | 11/1978 |
| FR | 2943965 B1 | 4/2011 |
| GB | 124441 A | 9/1970 |
| JP | H10250528 A | 9/1998 |

* cited by examiner

*Primary Examiner* — Toan C To
(74) *Attorney, Agent, or Firm* — Clements Bernard Walker; Christopher L. Bernard

(57) ABSTRACT

A seat belt for use in a vehicle including one or more seat cushions adapted to receive one or more vehicle occupants and a method for manufacturing the same is disclosed. The seat belt includes webbing, an anchor loop, and a fold. The anchor loop is formed at an end of the webbing affixed to a body of the webbing and adapted to pass through a belt receptacle anchor adapted to be fastened to a chassis of the vehicle. The fold is formed in the webbing adjacent to the anchor loop, such that a width of the webbing at the fold is less than a width of the webbing in other regions of the body.

20 Claims, 7 Drawing Sheets

VEHICLE SEAT BELT ASSEMBLY

TECHNICAL FIELD

The present disclosure relates generally to the automotive field. More particularly, the present disclosure relates to a vehicle seat belt assembly. The seat belt assembly finds applicability in both traditional and autonomous vehicles, especially in rear seat implementations.

BACKGROUND

A typical seat belt assembly includes a webbed synthetic fabric belt that is anchored to the vehicle body and frame at each end, a buckle member that includes a tongue and is slidable along a length of the webbed synthetic fabric belt, and a buckle anchored to the vehicle body and frame adjacent to a vehicle seat that mates with the tongue of the buckle member to secure and occupant seated in the vehicle seat. The webbed synthetic fabric belt can form a three-point seat belt that includes a lap belt that extends from a lower anchor point between seat cushions and/or adjacent to a vehicle seat and across the lap of an occupant to the buckle member and buckle. The three-point seat belt also includes a shoulder belt that extends from the buckle member and buckle across the chest and shoulder of the occupant to an upper anchor point adjacent to the vehicle seat for securing the occupant in the vehicle seat.

The lower anchor point can be disposed at a floor of the vehicle, such as next to and below the vehicle seat. The upper anchor point can be disposed above and/or behind the vehicle seat, such as at a cross-beam positioned behind the seat (such as adjacent to a trunk of the vehicle), at the roof of the vehicle, or at a vertical pillar of the vehicle. The seat belt assembly typically includes a retractor mechanism positioned at the upper (or lower) anchor point. The retractor mechanism generally includes a spool that winds the slack of the webbed synthetic fabric belt within the retractor mechanism, as well as arrests spooling out of the webbed synthetic fabric belt in the event of a vehicle impact event. The retractor mechanism may utilize a suitable pretensioner mechanism as well.

Any interruption in or interference with the webbed synthetic fabric belt between the lower anchor point and the upper anchor point/retraction mechanism can artificially reduce the amount of slack in the webbed synthetic fabric belt available. Such reduced amount of slack can prevent the occupant from properly and comfortably pulling the webbed synthetic fabric belt across his or her body and securing the tongue of buckle member into the buckle. Further, during a vehicle impact event, the forces applied to the occupant, and, in particular, the seat belt assembly, will cause a locking mechanism within the retractor mechanism to lock the spool and prevent any spooled slack of the webbed synthetic fabric belt from being released. By preventing the slack from being released, the occupant is secured in position within the vehicle seat.

The above description relating to seat belts for restraining occupants of a vehicle is merely intended to provide a contextual overview of some current issues and is not intended to be exhaustive. Other contextual information may become apparent to those of ordinary skill in the art upon review of the following description of exemplary embodiments.

SUMMARY

In one exemplary embodiment, the present disclosure provides a seat belt assembly for use in a vehicle including one or more seat cushions adapted to receive one or more vehicle occupants. The seat belt assembly includes an anchor and a seat belt. The anchor is adapted to be fastened to a chassis of the vehicle. The anchor includes a belt receptacle. The seat belt comprises webbing, an anchor loop, and a fold. The anchor loop is formed at an end of the webbing affixed to a body of the webbing and passes through the belt receptacle. The fold is formed in the webbing adjacent to the anchor loop, such that a width of the webbing at the fold is less than a width of the webbing in other regions of the body.

In one exemplary embodiment of the seat belt assembly, the fold is oriented orthogonal to the anchor loop. In another exemplary embodiment of the seat belt assembly, the fold includes sides of the webbing disposed adjacent to one another and held together. In a further exemplary embodiment of the seat belt assembly, the fold is a pleat.

In another exemplary embodiment of the seat belt assembly, the fold includes one or more stitches joining portions of the webbing adjacent to the anchor loop. In a still further exemplary embodiment, the seat belt assembly includes a clip positioned over the fold that holds overlapping portions of the webbing together. In a still further exemplary embodiment, the seat belt assembly includes one or more fasteners that hold overlapping portions of the webbing together at the fold.

In a further exemplary embodiment of the seat belt assembly, the fold includes a first side of the webbing, at a position adjacent to the anchor loop, being folded over a second side of the webbing along the width of the webbing, and one or more stitches joining the first side of the webbing to the second side of the webbing adjacent to the anchor loop.

In a still further embodiment of the seat belt assembly, the fold has a thickness that allows the seat belt to pass adjacent to or between the one or more seat cushions when the anchor is fastened to the chassis of the vehicle.

In another exemplary embodiment, the present disclosure provides a seat belt for use in a vehicle including one or more seat cushions adapted to receive one or more vehicle occupants. The seat belt includes webbing, an anchor loop, and a fold. The anchor loop is formed at an end of the webbing affixed to a body of the webbing and adapted to pass through a belt receptacle anchor adapted to be fastened to a chassis of the vehicle. The fold is formed in the webbing adjacent to the anchor loop, such that a width of the webbing at the fold is less than a width of the webbing in other regions of the body.

In one exemplary embodiment of the seat belt, the fold is oriented orthogonal to the anchor loop. In another embodiment of the seat belt, the fold includes sides of the webbing disposed adjacent to one another and held together.

In another exemplary embodiment of the seat belt, the fold includes one or more stitches joining portions of the webbing adjacent to the anchor loop. In a further exemplary embodiment the seat belt includes a clip positioned over the fold that holds overlapping portions of the webbing together. In a still further exemplary embodiment of the seat belt, the seat belt includes one or more fasteners that hold overlapping portions of the webbing together at the fold.

In a further exemplary embodiment of the seat belt, the fold has a thickness that allows the seat belt to pass adjacent to or between the one or more seat cushions when the anchor is fastened to the chassis of the vehicle.

In a further exemplary embodiment, the present disclosure provides a method for producing a seat belt. The method includes providing webbing. The method also includes forming a loop in an end of the webbing. The method further includes forming a fold in the webbing adjacent to the loop formed in the end of the webbing, such that a width of the webbing at the fold is less than a width of the webbing in other regions of the seat belt.

In one exemplary embodiment of the method, the fold is oriented orthogonal to the loop. In another exemplary embodiment of the method, the method includes securing the fold in the webbing using one or more of: one or more stitches disposed through the fold, a fastener disposed through the fold, and a clip disposed over the fold.

In a further exemplary embodiment of the method, forming the loop in the end of the webbing further comprises securing the loop through a belt receptacle anchor adapted to be fastened to a chassis of a vehicle.

BRIEF DESCRIPTION OF THE DRAWINGS

The present disclosure is illustrated and described herein with reference to the various drawings, in which like reference numbers are used to denote like assembly components/method steps, as appropriate, and in which.

DESCRIPTION OF EXEMPLARY EMBODIMENTS

Again, any interruption in or interference with the webbed synthetic fabric belt of a seat belt between the lower anchor point and the upper anchor point/retraction mechanism can artificially reduce the amount of slack in the webbed synthetic fabric belt available. Such reduced amount of slack can prevent the occupant from properly and comfortably pulling the webbed synthetic fabric belt across his or her body and securing the tongue of buckle member into the buckle. Further, during a vehicle impact event, the forces applied to the occupant, and, in particular, the seat belt assembly, will cause a locking mechanism within the retractor mechanism to lock the spool and prevent any spooled slack of the webbed synthetic fabric belt from being released. By preventing the slack from being released, the occupant is secured in position within the vehicle seat. However, the forces of the vehicle impact event may cause any webbed synthetic fabric belt "pinched" between the seat cushions, for example, to be suddenly released therefrom. The release of this trapped material results in an undesirable, sudden lengthening of the webbed synthetic fabric belt as the slack is released. This can allow the occupant to move relative to the vehicle seat due to the excess slack present in the webbed synthetic fabric belt during the vehicle impact event. When this occupant motion relative to the vehicle seat is suddenly arrested by the now-lengthened webbed synthetic fabric belt, occupant seat belt injury can result.

Figure 1:
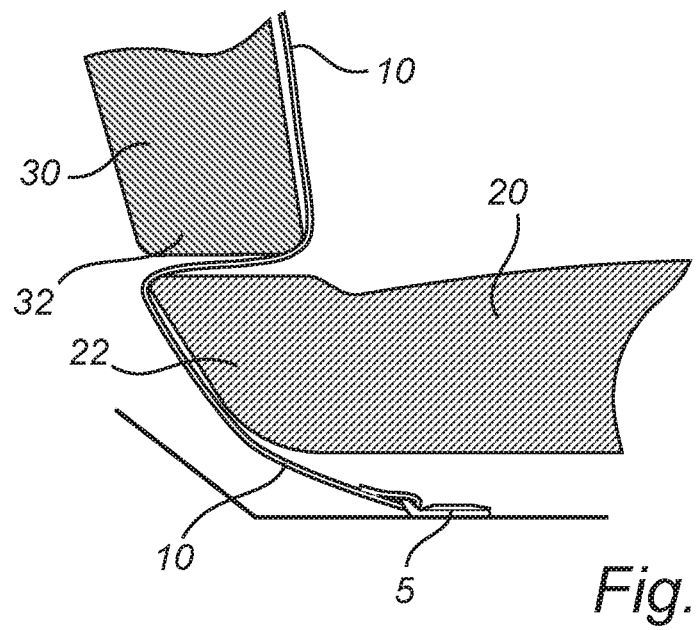
FIG. 1 is a planar side view of a side of a webbed fabric belt snagged on and looped around a back of a seat cushion and caught between the back of the seat cushion and a bottom of a seat back cushion.

The seat cushions of the vehicle are typically installed in the vehicle after the webbed synthetic fabric belt is secured to the lower and upper anchor points. As can be seen in FIG. 1, which illustrates such an installation, the webbed synthetic fabric belt 10 can be trapped on a back 22 of a seat cushion 20, especially between adjacent seat cushions 20, which causes the webbed fabric synthetic belt 10 to loop around the back 22 of the seat cushion 20, again, especially between adjacent seat cushions 20. Rather than pass next to the seat cushion 20, through a slot in the seat cushion 20, or between the seat cushion 20 and an adjacent seat cushion 20, the webbed synthetic fabric belt 10 is caught between the back 22 of the seat cushion 20 and the bottom 32 of the seat back cushion 30, for example. The resulting loop in the webbed synthetic fabric belt 10 thus captures slack that would normally be taken up by the spool when the webbed synthetic fabric belt 10 properly passes next to the seat cushion 20, through a slot in the seat cushion 20 or between the seat cushion 20 and an adjacent seat cushion 20. It is this captured slack that may be suddenly released during a vehicle impact event, potentially leading to occupant seat belt injury.

Thus, the present disclosure generally provides a seat belt assembly for use in a vehicle. The seat belt assembly includes a seat belt that is secured to the vehicle chassis by an anchor and that secures a vehicle occupant in a seat of the vehicle. The seat belt includes webbing and an anchor loop that secures the webbing to the anchor. The seat belt also includes a fold in the webbing adjacent to the anchor loop, such that a width of the webbing at the fold is less than a width of the webbing in other regions of the webbing. This fold narrows a width in the webbing in a region of the seat belt that is adapted to pass adjacent to a seat cushion, into a slot in the seat cushion, or between adjacent seat cushions during installation of the seat cushion(s). The narrow width of the webbing prevents the webbing from snagging or catching on a back of the seat cushion during installation of the seat cushion and helps assure that the webbing is properly situated relative to the seat cushion(s).

During the vehicle assembly process, the seat cushion(s) of the vehicle can be installed after the seat belt assembly is secured to the vehicle chassis at the anchor points. As the seat cushion(s) are installed, the seat belt passes adjacent to a seat cushion, into a slot of the seat cushion, or between adjacent seat cushions. The narrow width of the seat belt at the fold of the present disclosure allows the seat belt to pass adjacent to a seat cushion, into the slot of the seat belt cushion, or between adjacent seat cushions and reduces the chances that the seat belt can snag or catch on the back of a seat cushion during installation of the seat cushion(s). This helps assure that the seat belt is properly situated relative to the seat cushions(s) after the seat cushion(s) are installed and prevents excess slack from being released and present in the seat belt during a vehicle impact event.

Figure 2:
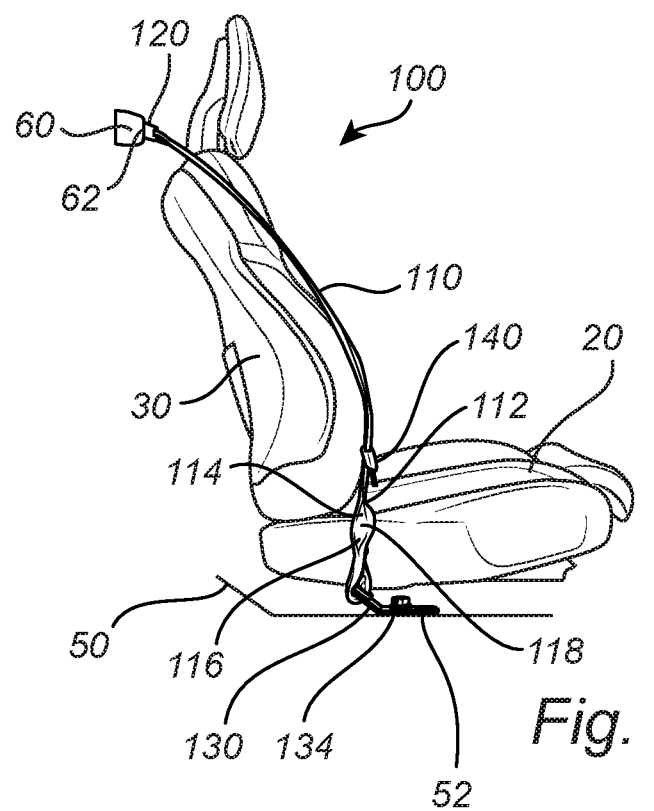
FIG. 2 is a planar side view of one exemplary embodiment of the seat belt assembly of the present disclosure and components of the vehicle surrounding the seat belt assembly.
Figure 3:
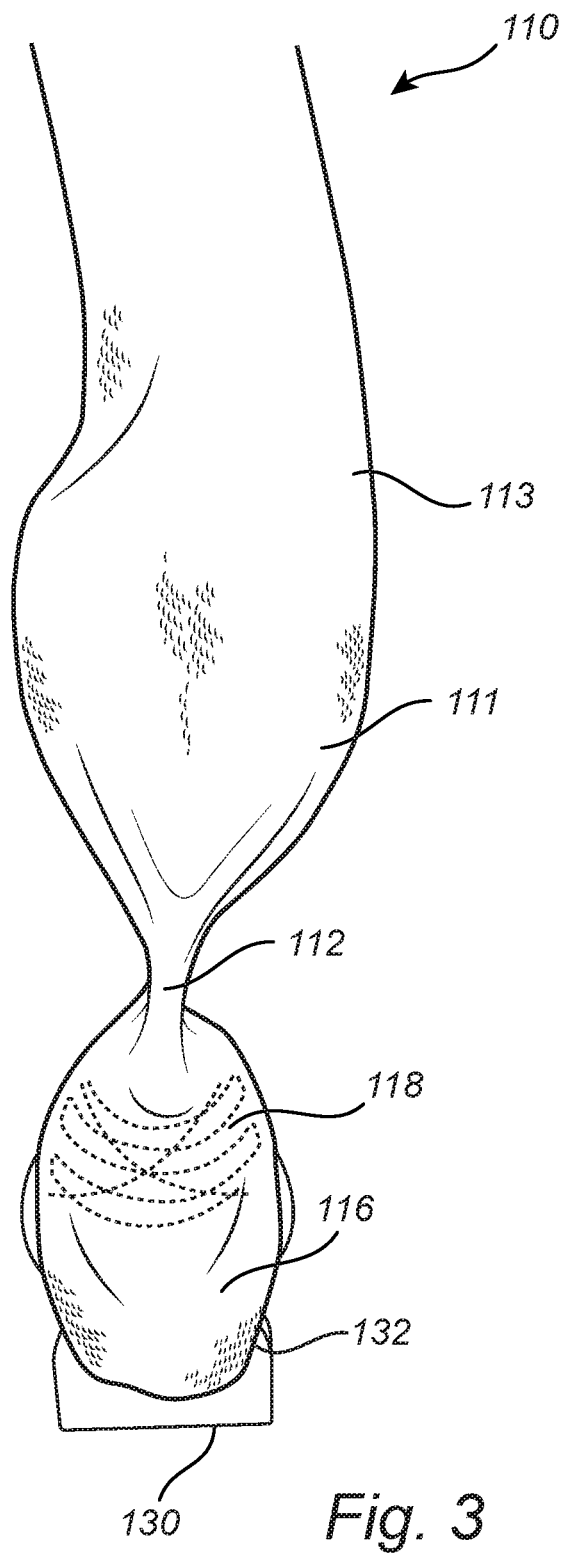
FIG. 3 is a front perspective view of the seat belt assembly at a fold of a seat belt of the seat belt assembly and an anchor for the seat belt of the seat belt assembly of FIG. 2.

FIG. 2 is a side perspective view of one exemplary embodiment of the seat belt assembly 100 of FIG. 1 and components of the vehicle surrounding the seat belt assembly 100. FIG. 3 is a front perspective view of the seat belt assembly 100 at a fold 112 of the seat belt 110 of the seat belt assembly 100 and an anchor 130 for the seat belt 110 of the seat belt assembly 100 of FIG. 2.

Referring to FIGS. 2 and 3, the seat belt assembly 100 of the present disclosure is for use in a vehicle that includes one or more seat cushions 20 adapted to receive one or more occupants of the vehicle. The vehicle also includes back cushions 30 that correspond to the seat cushions 20 and provide support for the back of the occupants of the vehicle. The seat cushions 20 are positioned adjacent to a lower portion 50 of the chassis, and the back cushions 30 are positioned adjacent to an upper portion 60 of the chassis. The lower portion 50, for example, is a floor of the chassis that provides a lower anchor point 52 for the seat belt assembly 100. The upper portion 60, for example, is a cross-beam of the chassis that provides an upper anchor point 62 for the seat belt assembly 100. Alternatively, the upper portion 60 is a roof or a vertical pillar of the chassis that provides the upper anchor point 62 for the seat belt assembly 100.

The seat belt assembly 100 includes a retractor mechanism 120, an anchor 130, a buckle member 140, and a seat belt 110. In the exemplary embodiment, the retractor mechanism 120 is fixed to the upper portion 60 of the chassis at the upper anchor point 62. The retractor mechanism 120 is positioned behind and above an upper portion of the back cushion 30. The retractor mechanism 120 includes a spool that winds slack of the seat belt within the retractor mechanism 120, which releases the slack to allow an occupant of the vehicle to secure the seat belt in place. The retractor mechanism 120 also includes a locking mechanism that prevents the slack from being fed from the spool during a crash event. As an alternative, the retractor mechanism 120 could also be positioned in the backrest of a rear seat, for example, especially in a sport utility vehicle (SUV) or the like.

The anchor 130 is adapted to fasten to the chassis of the vehicle, and in particular, to the lower portion 50 of the chassis at the lower anchor point 52 by a fastener 134, such as a bolt or a screw. The anchor 130 defines a belt receptacle 132. The belt receptacle 132 includes a hole through which the seat belt 110 passes.

The buckle member 140 secures the seat belt 110 to a buckle for securing the occupant of the vehicle to the seat.

In embodiments, the seat belt 110 is a three-point seat belt that forms a lap belt that extends from the anchor 130 across the lap of the occupant of the vehicle to the buckle member 140 and forms a shoulder belt that extends from the buckle member 140 across the chest and shoulder of the occupant of the vehicle to the retractor mechanism 120 to secure the occupant of the vehicle in the seat during a crash event.

The seat belt 110 includes webbing 111, an anchor loop 116, and a fold 112. The webbing 111 typically extends from the anchor 130 to the retractor mechanism 120, with any excess slack of the webbing 111 being wound on the spool. The webbing 111 is a webbed fabric, a webbed synthetic fabric, combinations thereof, or any other suitable material for securing a vehicle occupant in the seat.

The anchor loop 116 is formed at an end of the webbing 111. The anchor loop 116 is affixed to a body 113 of the webbing 111. For example, an end of the webbing 111 is folded back over the body 113 of the webbing 111 in a length direction of the webbing 111 and affixed thereto. The end of the webbing 111 is affixed to the body 113 of the webbing 111 in such a manner that the opening in the loop formed thereby is oriented in a width direction of the webbing 111. The end of the webbing 111 is affixed to the body 113 of the webbing via stitching that extends in the width direction of the webbing 111. The stitching is one or more rows of stitching, which results in the anchor loop 116 being stiffer than the body 113 of the webbing 111. The anchor loop 116 also passes through the belt receptacle 132 of the anchor 130, which secures the seat belt 110 to the anchor 130.

The fold 112 is formed in the webbing 111 adjacent to the anchor loop 116, such that a width of the webbing 111 at the fold 112 is less than a width of the webbing 111 in other regions of the body 113 of the webbing 111. In embodiments, the fold 112 includes a portion of the anchor loop 116, such as the portion of the anchor loop 116 that includes the stitching 118. The width of the fold 112 is also less than the standard width of the anchor loop 116. However, the portions of the body 111 and the anchor loop 116, such as at the stitching 118, adjoining the fold 112, while being wider than the fold 112, are narrower than other portions of the body 111 and the anchor loop 116 as the webbing 111 and the anchor loop 116 in those regions transition from the fold 112 to the other portions of the body 111 and the anchor loop 116.

In embodiments, the fold 112 is oriented orthogonal to the anchor loop 130. For example, a crease in the webbing 111 is formed in the length direction of the webbing 111 that is orthogonal to the direction that the opening of the anchor loop 116 creates, which extends in the width direction of the webbing 111.

In embodiments, the fold 112 also includes sides of the webbing 111 that are disposed adjacent to one another and held together, and in some embodiments, the fold 112 is a pleat.

Figure 4:
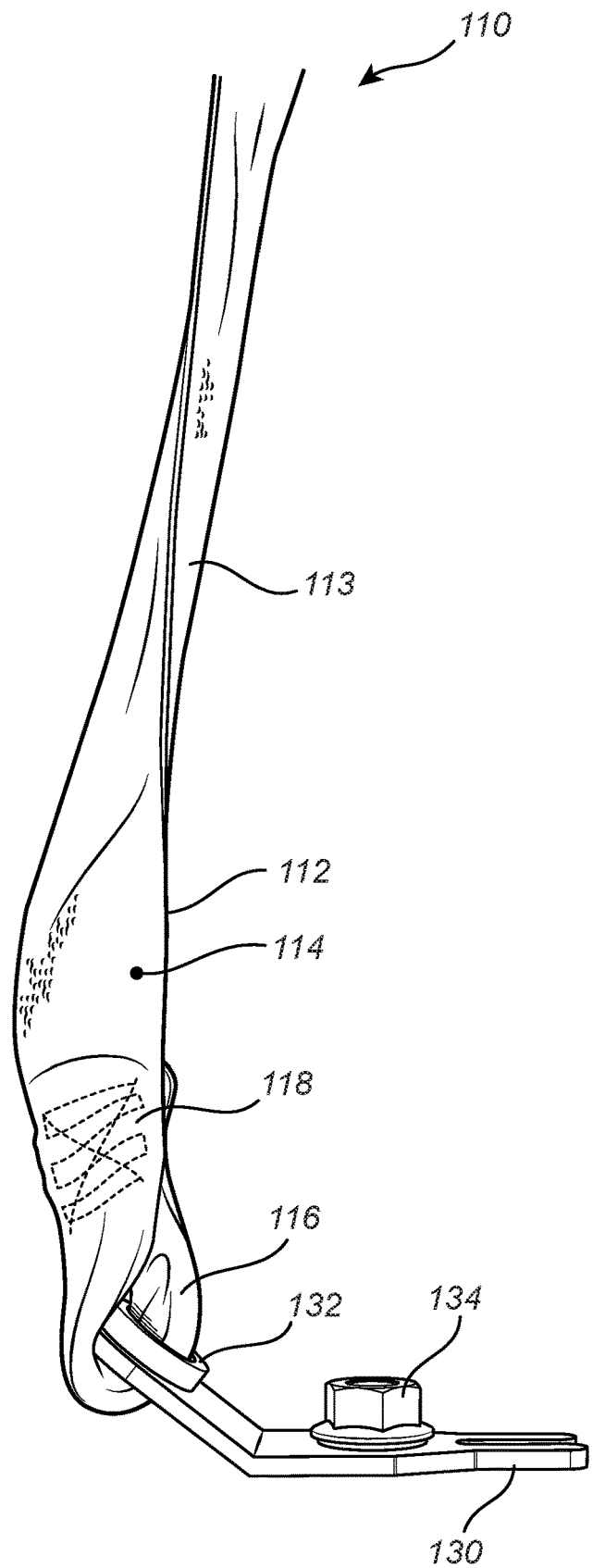
FIG. 4 is a side perspective view of the seat belt assembly of FIG. 3 at the fold of the seat belt of the seat belt assembly and the anchor of the seat belt assembly with one or more stiches securing the fold in place.
Figure 5:
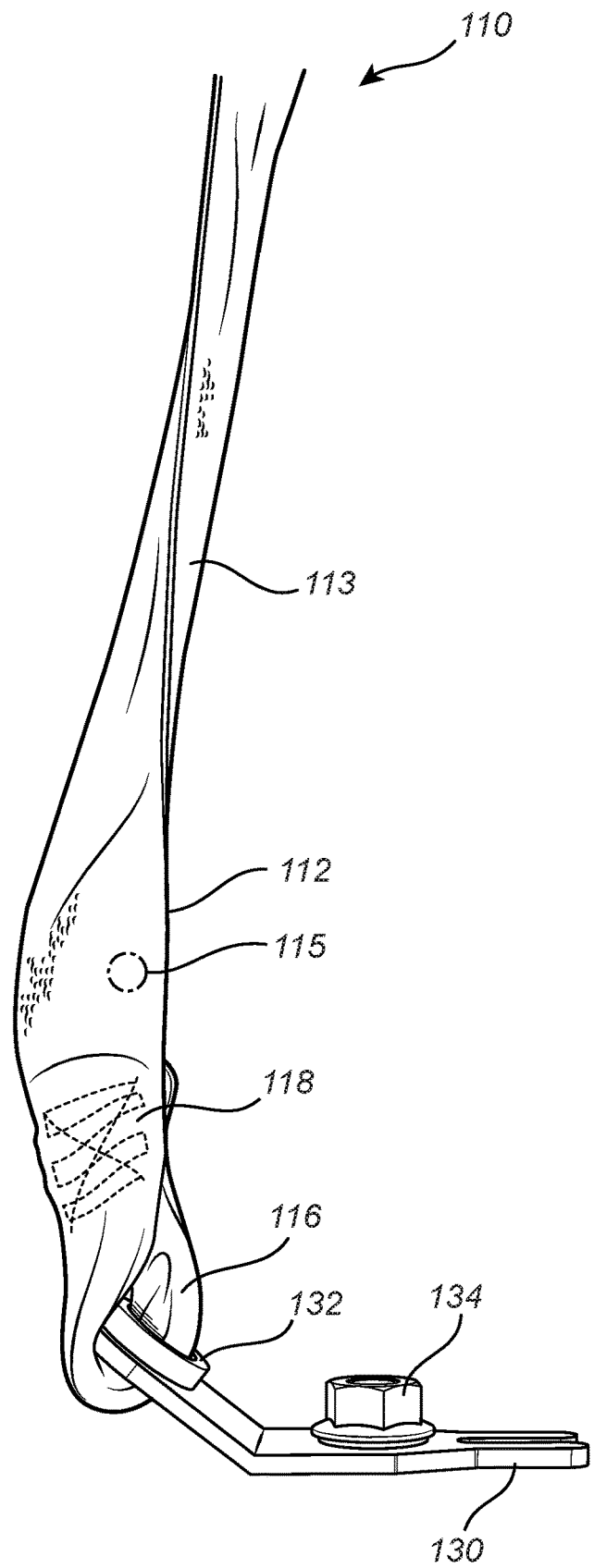
FIG. 5 is a side perspective view of the seat belt assembly of FIG. 3 at the fold of the seat belt of the seat belt assembly and the anchor of the seat belt assembly with a fastener securing the fold in place.
Figure 6:
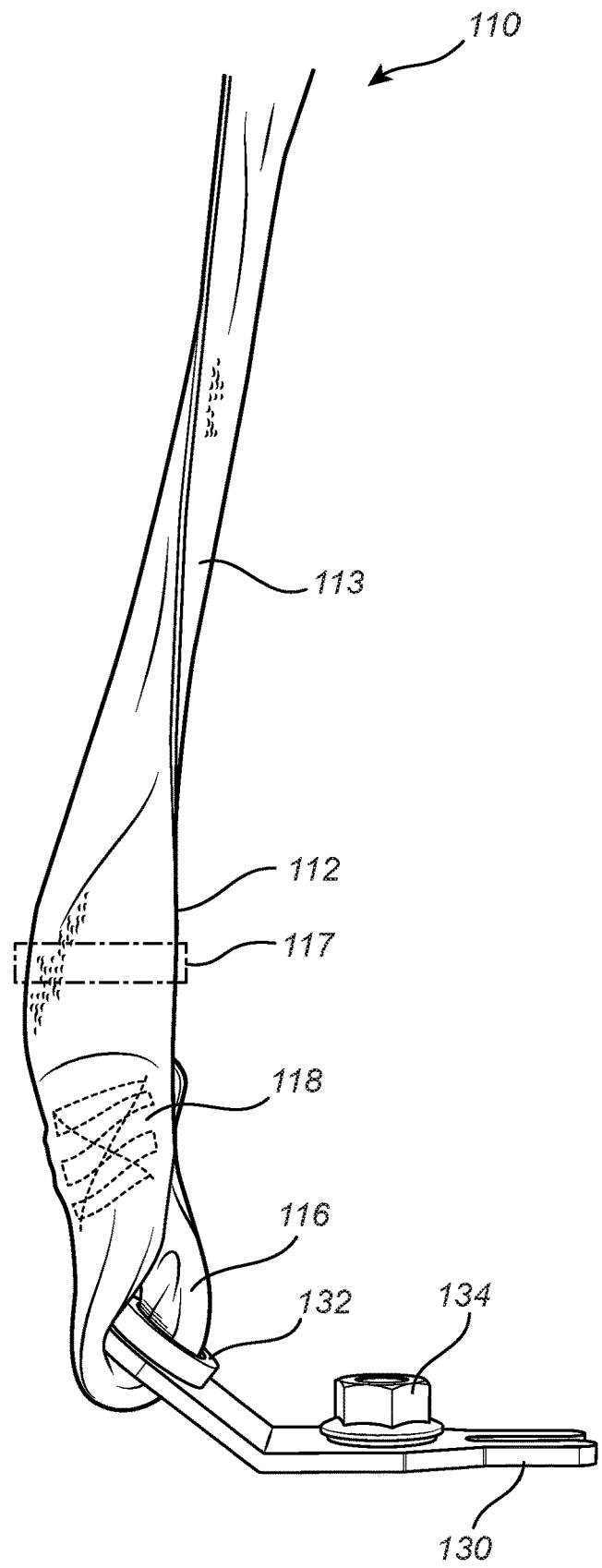
FIG. 6 is a side perspective view of the seat belt assembly of FIG. 3 at the fold of the seat belt of the seat belt assembly and the anchor of the seat belt assembly with a clip securing the fold in place.

FIG. 4 is a side perspective view of the seat belt assembly 100 of FIG. 3 at the fold 112 of the seat belt 110 of the seat belt assembly 100 and the anchor 130 of the seat belt assembly 100 with one or more stiches 114 securing the fold 112 in place. FIG. 5 is a side perspective view of the seat belt assembly 100 of FIG. 3 at the fold 112 of the seat belt 110 of the seat belt assembly 100 and the anchor 130 of the seat belt assembly 130 with a fastener 115 securing the fold 112 in place. FIG. 6 is a side perspective view of the seat belt assembly 100 of FIG. 3 at the fold 112 of the seat belt 110 of the seat belt assembly 100 and the anchor 130 of the seat belt assembly 100 with a clip 117 securing the fold 112 in place.

Referring to FIG. 4, in some embodiment, the fold 112 is held in place such that portions of the webbing 111 are joined together. In some of these embodiments, the portions of the webbing 111 are held by one or more stitches 114. Further, when the fold 112 includes a first side of the webbing 111, at a position adjacent to the anchor loop 116, being folded over a second side of the webbing 111 along the width of the webbing 111, the one or more stitches 114 optionally join the first side of the webbing 111 to the second side of the webbing 111 adjacent to the anchor loop 116. The portions of the webbing 111 are joined adjacent to the anchor loop 116, and the one or more stitches 114 are positioned adjacent to the anchor loop 116. Optionally, when more than one stitch is used, the stitches 114 extend vertically in the length direction of the webbing 111, along the sides of the webbing 111 being held adjacent to one another, which is optionally parallel to any crease formed in the webbing 111 by the fold 112. Or, optionally, the stitches 114 extend horizontally in the width direction of the webbing 111, such that the one or more lines of stitches 114 extends across the portions of the webbing that are held together, which one or more lines is optionally orthogonal to any crease formed in the webbing 111 by the fold 112. Other patterns of stitching are also considered.

Referring to FIG. 5, the seat belt assembly 100, optionally, further includes one or more fasteners 115 that hold overlapping portions of the webbing 111 together at the fold 112. The one or more fasteners 115 include, for example, one or more bolts that extend through the overlapping portions of the webbing 111 and corresponding nuts that are secured to the bolts. Like the stitches 114, when more than one set of fasteners 115 are used, the fasteners, optionally, are positioned in the vertical direction along sides of the webbing 111, or in the horizontal direction in the width direction of the webbing 111. Other patterns of fasteners are also considered.

Referring to FIG. 6, the seat belt assembly 100, optionally, further includes one or more clips 117. The one or more clips 117 are positioned over the fold 112 and hold the overlapping portions of the webbing 111 together.

Figure 7:
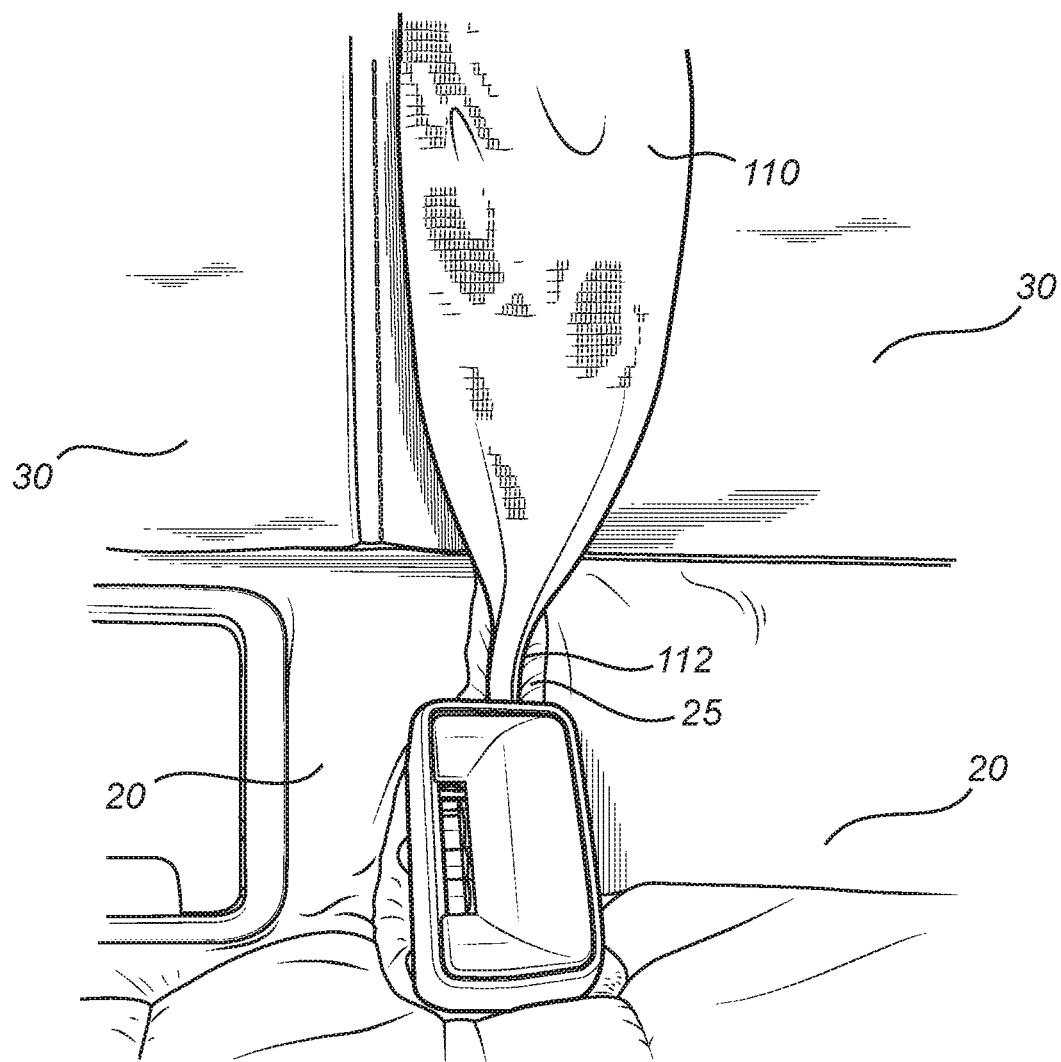
FIG. 7 is a front perspective view of the seat belt assembly and the components of the vehicle surrounding the seat belt assembly of FIG. 2, specifically highlighting the fold of the seat belt preventing the seat belt from being captured between adjacent seat cushions when installed.

FIG. 7 is a front perspective view of the seat belt assembly 100 and the components of the vehicle surrounding the seat belt assembly 100 of FIG. 2. Referring to FIG. 7, as will be described in greater detail below, the fold 112 has a thickness that allows the seat belt 110 to pass adjacent to one or more seat cushions 20, into a slot formed by the one or more seat cushions 20, or between the one or more seat cushions 20 while the anchor 130 is fastened to the chassis of the vehicle.

Figure 8:
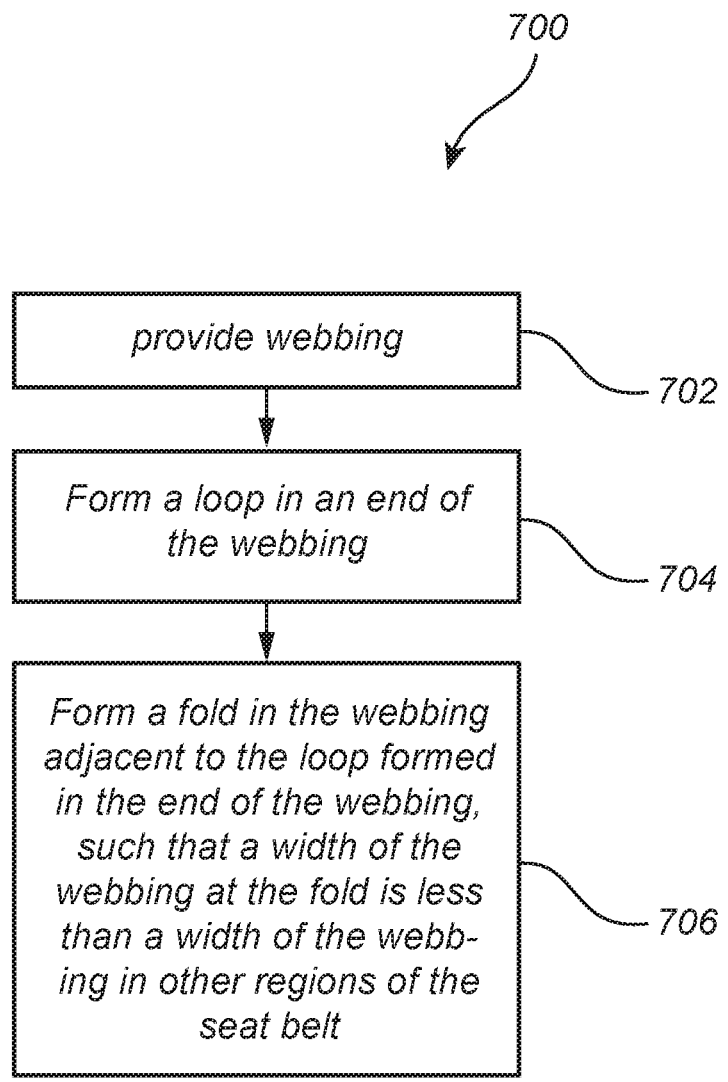
FIG. 8 is a flowchart of a method for producing the seat belt of the seat belt assembly of FIGS. 2-6.

FIG. 8 is a flowchart of a method 700 for producing the seat belt 110 of the seat belt assembly 100 of FIGS. 2-6. The method 700 includes providing webbing 111 at step 702. The webbing 111 is webbed fabric, webbed synthetic fabric, a combination thereof, and the like.

The method 700 also includes forming a loop in an end of the webbing 111 at step 704. The loop is the anchor loop 116 as described in greater detail above.

The method 700 further includes forming a fold 112 in the webbing 111 adjacent to the loop formed in the end of the webbing 111, such that a width of the webbing 111 at the fold 112 is less than a width of the webbing 111 in other regions of the seat belt 110. In some embodiments of the method, the fold 112 is oriented orthogonal to the loop.

In embodiments, the loop is formed in the end of the webbing 111 by folding an end of the webbing 111 back over a body of the webbing 111 and stitching the end to the body 111 of the webbing 111. The loop and the stitching result in this region of the seat belt 110 being stiffer than other portions of the seat belt 110. In embodiments, this stiffness facilitates the formation of the fold 112 in the webbing 111.

In embodiments, the method 700 also includes securing the fold 112 in the webbing 111 using one or more of: one or more stitches 114 disposed through the fold 112, a fastener 115 disposed through the fold 112, and a clip 117 disposed over the fold 112. In embodiments, the one or more stiches 114, the fastener 115, and the clip 117 are positioned or formed in any of the orientations disclosed above.

In some embodiments of the method 700, forming the loop in the end of the webbing 111 further comprises securing the loop through a belt receptacle 132 of an anchor 130 adapted to be fastened to a chassis of a vehicle. The loop is fed through the belt receptacle 132 before the end of the webbing 111 is secured to the body 113 of the webbing 111.

In embodiments, the method 700 also includes forming the fold 112, adding stitches 114 in any other manner as disclosed herein, such as forming the fold 112 as a pleat, and the like.

Referring again to FIGS. 2 and 7, and as noted above, during the manufacturing process of the vehicle, the seat cushion(s) 20 of the vehicle are installed after the seat belt assembly 110 is secured therein, such as after the retractor mechanism 120 is secured to the upper portion 60 of the chassis at the upper anchor point 62 and the anchor 130 is secured to the lower portion 50 of the chassis at the lower anchor point 50. As the seat cushion(s) 20 are installed, the webbing 111 of the seat belt 110, and in particular the fold 112 of the seat belt 110 passes adjacent to a seat cushion 20, into a slot of the seat cushion 20, or between adjacent seat cushions 20.

The narrower width of the seat belt 110 at the fold 112 facilitates the webbing 111 to pass by end corner(s) of the seat cushion(s) 20 without snagging or catching thereon during installation of the seat cushion(s) 20. This helps assure that the seat belt 110 is properly situated relative to the seat cushions(s) 20 after the seat cushion(s) 20 are installed.

Further, by preventing the webbing 111 from snagging or catching a corner of a seat cushion 20, excess slack is not taken from the spool, which helps assure proper operation of the seat belt assembly 100. For example, with the proper amount of slack on the spool an occupant of the vehicle is able to properly pull the seat belt across the occupant's body to secure the buckle member 140 in the buckle without running out of slack. Further, since there is no excess slack in the seat belt 110, in the event of a crash event, such slack cannot be released and the seat belt assembly 100 will maintain a proper amount of tension in the seat belt 110 and properly secure the occupant of the vehicle during a crash event.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A seat belt assembly, comprising:
   an anchor adapted to be fastened to a chassis of a vehicle, the anchor defining a belt receptacle; and
   a webbed belt, comprising:
      an anchor loop formed at an end of the webbed belt, the anchor loop engaging the belt receptacle of the anchor, and
      a fold formed in the webbed belt adjacent to the anchor loop, such that a width of the webbed belt at the fold is reduced as compared to other regions of the webbed belt, wherein the fold comprises sides of the webbed belt disposed adjacent to one another and held together.

2. The seat belt assembly of claim 1, wherein the fold is oriented orthogonal to the anchor loop.

3. The seat belt assembly of claim 1, wherein the fold comprises the sides of the webbed belt disposed adjacent to one another along a crease formed in a length direction of the webbed belt and held together.

4. The seat belt assembly of claim 1, wherein the fold is a pleat.

5. The seat belt assembly of claim 1, wherein the fold includes stitches joining portions of the webbed belt adjacent to the anchor loop.

6. The seat belt assembly of claim 1, further comprising a clip positioned over the fold that holds overlapping portions of the webbed belt together.

7. The seat belt assembly of claim 1, further comprising a fastener that holds overlapping portions of the webbed belt together at the fold.

8. The seat belt assembly of claim 1, wherein the fold includes a first side of the webbed belt, at a position adjacent to the anchor loop, being folded over a second side of the webbed belt along the width of the webbed belt, and stitches joining the first side of the webbed belt to the second side of the webbed belt adjacent to the anchor loop.

9. The seat belt assembly of claim 1, wherein the fold has a thickness that allows the webbed belt to pass adjacent to or between the one or more seat cushions while the anchor is fastened to the chassis of the vehicle.

10. A seat belt, comprising:
    a webbed belt;
    an anchor loop formed at an end of the webbed belt and adapted to engage a belt receptacle anchor adapted to be fastened to a chassis of a vehicle; and
    a fold formed in the webbed belt adjacent to the anchor loop, such that a width of the webbed belt at the fold is reduced as compared to other regions of the webbed belt, wherein the fold comprises sides of the webbed belt disposed adjacent to one another and held together.

11. The seat belt of claim 10, wherein the fold is oriented orthogonal to the anchor loop.

12. The seat belt of claim 10, wherein the fold includci comprises the sides of the webbed belt disposed adjacent to one another along a crease formed in a length direction of the webbed belt and held together.

13. The seat belt of claim 10, wherein the fold includes stitches joining portions of the webbed belt adjacent to the anchor loop.

14. The seat belt of claim 10, further comprising a clip positioned over the fold that holds overlapping portions of the webbed belt together.

15. The seat belt of claim 10, further comprising a fastener that holds overlapping portions of the webbed belt together at the fold.

16. The seat belt assembly of claim 10, wherein the fold has a thickness that allows the webbed belt to pass adjacent to or between the one or more seat cushions when the belt receptacle anchor is fastened to the chassis of the vehicle.

17. A method for producing a seat belt, comprising:
    providing webbed belt;
    forming a loop in an end of the webbed belt; and
    forming a fold in the webbed belt adjacent to the loop formed in the end of the webbed belt, such that a width of the webbed belt at the fold is reduced as compared to other regions of the webbed belt, wherein the fold comprises sides of the webbed belt disposed adjacent to one another and held together.

18. The method of claim 17, wherein the fold is oriented orthogonal to the loop.

19. The method of claim 17, further comprising securing the fold in the webbed belt using one or more of:
    stitches disposed through the webbed belt at the fold,
    a fastener disposed through the webbed belt at the fold, and
    a clip disposed over the webbed belt at the fold.

20. The method of claim 17, wherein forming the loop in the end of the webbed belt further comprises securing the loop through a belt receptacle of an anchor adapted to be fastened to a chassis of a vehicle.

* * * * *